(12) United States Patent
Glaesener

(10) Patent No.: US 7,604,477 B2
(45) Date of Patent: Oct. 20, 2009

(54) MOLDING MACHINE AND MELT CHANNEL INTERFACE

(75) Inventor: Pierre Glaesener, Bissen (LU)

(73) Assignee: Husky Injection Molding Systems Ltd. (CA)

( * ) Notice: Subject to any disclaimer, the term of this patent is extended or adjusted under 35 U.S.C. 154(b) by 142 days.

(21) Appl. No.: 11/043,755

(22) Filed: Jan. 26, 2005

(65) Prior Publication Data

US 2005/0287244 A1    Dec. 29, 2005

(30) Foreign Application Priority Data

Jun. 29, 2004   (GB)  ................. 0414520.7

(51) Int. Cl.
*B29C 45/22* (2006.01)
(52) U.S. Cl. .............. 425/569; 425/570; 425/572
(58) Field of Classification Search .............. 425/569, 425/570, 572
See application file for complete search history.

(56) References Cited

U.S. PATENT DOCUMENTS

| | | | |
|---|---|---|---|
| 3,671,162 A * | 6/1972 | Lohmann .................... 425/563 |
| 4,213,751 A * | 7/1980 | Fernandez ................... 425/566 |
| 4,299,791 A | 11/1981 | Aoki | |
| 4,344,750 A | 8/1982 | Gellert | |
| 4,822,269 A * | 4/1989 | Kamiyama et al. .......... 425/203 |
| 4,917,595 A | 4/1990 | Nakamura et al. | |
| 5,011,646 A | 4/1991 | Bertschi | |
| 5,127,819 A | 7/1992 | Wright | |
| 5,324,191 A * | 6/1994 | Schmidt ..................... 425/549 |
| 5,458,843 A | 10/1995 | Brown et al. | |
| 5,474,439 A * | 12/1995 | McGrevy .................... 425/549 |
| 5,736,171 A * | 4/1998 | McGrevy .................... 425/549 |
| 5,820,899 A * | 10/1998 | Gellert et al. ............... 425/549 |
| 5,980,237 A * | 11/1999 | Swenson et al. ............ 425/549 |
| 6,106,275 A * | 8/2000 | Huff et al. ................... 425/563 |
| 2002/0098262 A1* | 7/2002 | Babin ......................... 425/562 |
| 2004/0183231 A1* | 9/2004 | Kishi et al. ............. 264/328.1 |
| 2004/0234645 A1* | 11/2004 | Nakanishi ................... 425/566 |

FOREIGN PATENT DOCUMENTS

| | | | |
|---|---|---|---|
| EP | 0933186 A | | 8/1999 |
| WO | WO 2004/043675 A1 | | 5/2004 |

* cited by examiner

*Primary Examiner*—Yogendra Gupta
*Assistant Examiner*—Emmanuel S Luk

(57) ABSTRACT

Disclosed is a mold carrier having: a first external surface and a second external surface being located opposite the first external surface, arranged to mount, in use, respective mold halves; a main hot runner channel; first and second hot runner nozzles in a back-to-back configuration, the first and second hot runner nozzles having bases and connected to the main hot runner channel to receive, in use, molten plastic therefrom, the first and second hot runner nozzles each having a substantially planar sealing surface configured to provide an interface, in use, to a substantially planar interface surface in the respective mold halves; and springs operatively mounted between the nozzle bases and nozzles to spring-load the nozzles against the mold halves for improved sealing sprue bushings being received in the mold halves; and mold locating rings being received by the first external surface and the second external surface, the mold locating rings being configured to locate and position the mold halves relative to the first and second hot runner nozzles and of the sprue bushings, and the mold locating rings aligning and locating with a selected one of the mold halves so that the first and second hot runner nozzles may touch the sprue bushings.

7 Claims, 3 Drawing Sheets

MOLDING MACHINE AND MELT CHANNEL INTERFACE

BACKGROUND OF THE INVENTION

1. Field of the Invention

This invention relates, in general, to an interface between melt channels of two interfacing components. In this context, the invention relates particularly, but not exclusively, to melt channel alignment between a nozzle and a distribution component in a molding system and more especially to a dual interface that provides a centrally located fluid egress point that is located between and commonly feeds two independently functioning fluid distribution systems.

2. Summary of the Prior Art

In prior art systems where, for example, a nozzle interface to a sprue bushing that feeds into a single hot runner or the like, melt channel alignment from the distributor into the sprue bushing can be maintained through use of a mechanical adjustment of the carriage assembly. As will be appreciated, the carriage assembly supports the injection unit/screw. Of course, this assumes that any central misalignment between the respective melt channels in a distributor (e.g. the nozzle of the screw) and the mold sprue bushing (or the like) is itself within the specified correctable (adjustment) range for the carriage assembly. Unfortunately, however, in multi-mold systems where a single distributor simultaneously feeds at least two remotely (but complementarily) located mold sprue bushings, use of the carriage assembly adjustment may act to correct alignment in one of the melt channel paths of the system, but may simultaneously exacerbate melt leakage in the other melt channel by increasing misalignment. In other words, channel misalignment arises from a relative lateral shift in respective centre lines for the different melt channels.

The undesirably mechanism by which melt leaks at the interface of, for example, the nozzle is sometimes referred to as "drooling".

In an exemplary instance of an injection molding system, failure to provide an acceptable horizontal radial alignment and, consequently, an effective seal between the nozzle and the runner systems can compromise system operation. Melt leakage can, for example, cause: i) parts to be mis-formed, e.g. through short shot delivery issues; and ii) unacceptably early mold component wear arising. In any event, there is a related financial expense to the mold operator. Indeed, radial misalignment can never be avoided because of thermal elongation problems, especially in relation to a runner (such as a hot runner) system that has a typically operational temperature of about three hundred degrees Celsius.

It is established practice that the interface between a nozzle and the sprue has been realised a radial interface in which a smaller nozzle (convex) radius fits into a larger (concave) radius or seat in the sprue. By accomplishing radial alignment, a contiguous melt channel is realised between the nozzle and the sprue through the surrounding annular contact surface. Moreover, some form of return spring provides physical loading of the interface between the external contact surfaces of the nozzle and the sprue, thereby improving the resultant seal.

Even a small misalignment results in limited point contact around only a portion of the circumference of the seat. Consequently, when there is a radial misalignment in the central axis of the melt channels (of the nozzle and sprue bushing) a crack to the melt channel appears.

In the context of a nozzle that feeds a plurality of distributors (such as when a melt delivery system is located within a centre-section carrier of a stack mold), it is usual that this arrangement is much stiffer in a radial direction than a standard single injection nozzle configuration. The additional stiffness arises because, overall, the entire melt delivery system (and particularly the nozzle) is considerably shorter in size. Unfortunately, there is an associated increase in precision alignment required in mounting such systems and hence a higher likelihood that drooling can occur from ineffectual (i.e. partial) sealing at the nozzle-sprue interface.

U.S. Pat. No. 4,299,791 describes a method of avoiding drool by varying the volume of the sprue (of the mold) by movement of a plunger in radially-shaped nozzle. U.S. Pat. No. 4,917,595 also shows a spherically shaped nozzle that locates within a correspondingly shaped nozzle touch sprue bushing, whereby melt channel alignment between the nozzle and sprue is achieved through this "ball and socket"-type alignment.

SUMMARY OF THE INVENTION

According to a first aspect of the present invention there is provided a mold having: a first external surface and a second external surface opposite the first surface, the first and second surfaces being substantially planar and each surface arranged to mount, in use, respective mold halves; a main hot runner channel; first and second hot runner nozzles in a back-to-back configuration, the first and second hot runner nozzles connected to the main hot runner channel to receive, in use, molten plastic therefrom, the first and second hot runner nozzles each having a substantially planar sealing surface configured to provide an interface, in use, to a substantially planar interface surface in the respective mold halves.

Preferably, the first and second surfaces each include a recess surrounding each of the first and second hot runner nozzles, the recess arranged to site, in use, a mold locating ring.

Preferably, the substantially planar sealing surface of the first and second nozzles is recessed behind its respective external surface of the mold carrier.

The present invention therefore advantageously ensures that melt channels within a hot runner system and interface, such as a sprue bushing, are sealed to permit effective coupling of a runner system supported on a centre-section carrier supporting a back-to-back mold environment. Under appropriate positive biasing, the flat faces of the nozzle and sprue bushing therefore produce a substantially flat (i.e. planar) sealing interface that maintains sealing contact in the face of potential radial misalignment between the various melt channels. The biasing may be provided by thermal expansion of the components such as the nozzle. As the nozzle rises in temperature it will expand and the abutting surfaces brought into an efficient sealing contact.

Preferably, however, a resilient member is included to provide the bias to urge the abutting surfaces into contact. The resilient member may act directly on the nozzle, as in the preferred embodiment, or directly on the sprue bushing.

The resilient member may be a spring, such as a spring washer. In the described embodiment the resilient member is a cup washer.

To enable the resilient to act on the nozzle, the nozzle further comprises a flange against which the resilient member acts to urge the abutting surfaces into contact. Preferably, the nozzle has a stepped profile to provide the flange.

Conveniently, the flange engages a stop to limit outward movement of the nozzle from the interface. In the preferred embodiment, the stop is provided by an annular wall of a nozzle retaining ring.

Preferably, the nozzle is slideably located in a base portion between a deployed position in which the abutting surface of the nozzle is urged into sealing engagement with the abutting surface of the sprue bushing by the resilient member and a retracted position.

The base portion preferably includes a bore coaxial with a bore of the nozzle which bore has a first substantially constant radius portion, a second substantially constant radius portion wherein the nozzle is slideably located and an intermediate portion of conical section varying in radius to provide a transition between the first and second constant radius portions.

A number of nozzle configurations will be of utilisation in the interface but, in the described embodiment, the nozzle includes an axial bore having a conically sectioned inlet portion and a substantially constant outlet portion.

In a second aspect of the invention there is provided a molding machine comprising: a) a mold carrier having: a first external surface and a second external surface opposite the first external surface, the first and second external surfaces being substantially planar and each surface arranged to mount, in use, respective mold halves; a melt channel distribution system; and first and second machine nozzles in a back-to-back configuration, the first and second machine nozzles connected to the melt channel distribution system to receive, in use, molten plastic therefrom, the first and second machine nozzles each having a substantially planar sealing surface configured as an interface; and b) first and second mold halves respectively mounted in each of the first and second external surfaces, the first and second mold halves each including a sprue bushing having a substantially planar interface surface in sealing contact with a respective one of the sealing surfaces of the first and second machine nozzles, whereby planar interfaces are formed between the machine nozzles and sprue bushings; wherein each of the machine nozzles and sprue bushing contain a melt channel, the planar interface cooperating to produce sealing contacts between the machine nozzles and sprue bushings on both sides of the mold carrier about the melt channels.

Advantageously, the present invention provides a nozzle-distributor interface realised by abutting, substantially planar faces on both the nozzle and sprue bushing. Beneficially, individual interfaces on the nozzle and distributor are more easily and cheaply manufactured, since there is no precision machining of radii and, more critically, no need to control, during manufacturing, the location of the radii on each of the interfacing components.

Additionally, the present invention ensures the production of an effective and complete annular seal even when there are a plurality of individual distributors (e.g. molds) feeds from a single nozzle having a plurality of melt egress points. Furthermore, since the interface compensates for relative radial displacement between nominal centre lines between multiple molds, the present invention obviates (to some extent) the requirement to provide a carriage with a mechanical alignment mechanism.

BRIEF DESCRIPTION OF THE DRAWINGS

Embodiments of the invention will be described, by way of example only, with reference to the drawings, in which.

DETAILED DESCRIPTION OF A PREFERRED EMBODIMENT

Figure 1:
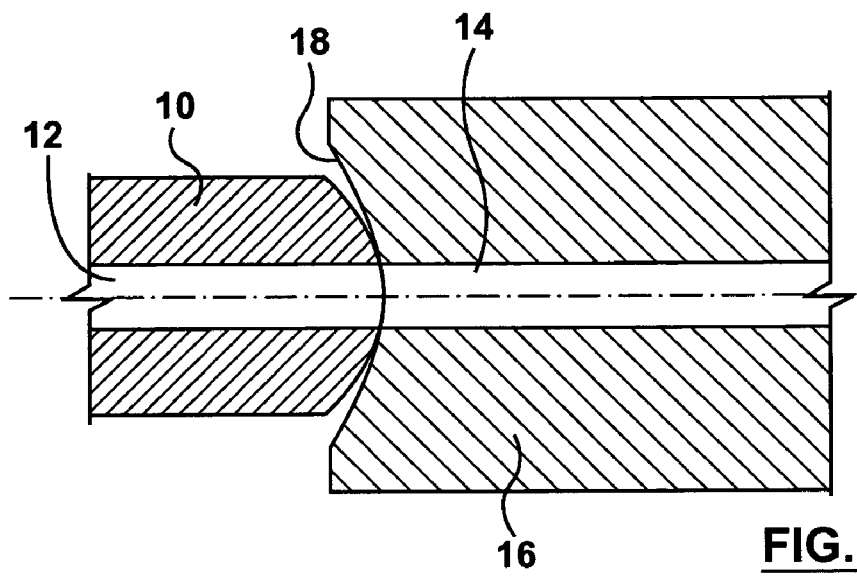
FIG. 1 is an aligned nozzle and sprue bushing interface of the prior art.
Figure 2:
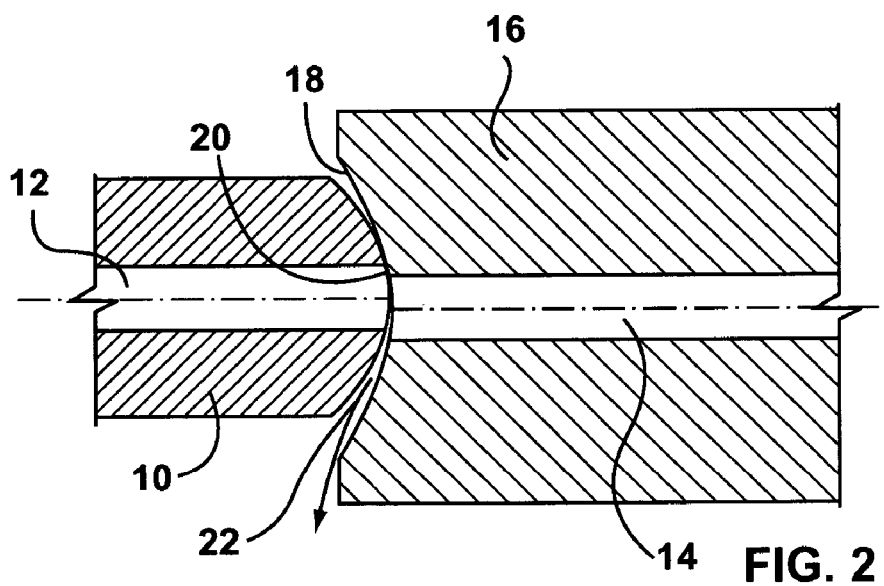
FIG. 2 shows misalignment in a melt channel between a prior art nozzle and sprue bushing interface.

Referring to the prior art configurations of FIGS. 1 and 2, a convex-shaped nozzle tip 10 contains a central melt channel 12 that is supposed to align perfectly with a secondary melt channel 14 in a distributor (in this case a sprue bushing 16). The sprue bushing 16 has a concave face 18 radially larger than that of the nozzle tip 10, which concave face therefore provide a seat for (and hence acts to locate) the nozzle tip 10. In FIG. 2, relative radial displacement of the central melt channel 12 with respect to the secondary melt channel 14 (of the sprue bushing) results in limited point contact 20 between the nozzle tip 10 and the concave face 18 and hence the formation of a gap 22, as previously described.

Figure 3:
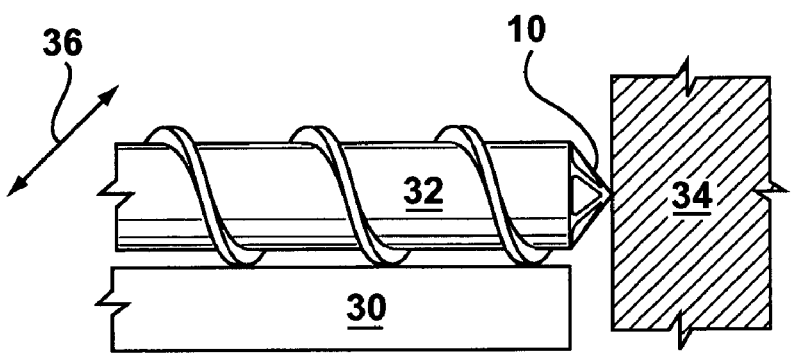
FIG. 3 is a schematic illustration of a prior art carriage of an injection unit.

FIG. 3 illustrates a carriage assembly 30 on which is mounted an injection unit or screw 32 having a nozzle 10. The nozzle interfaces into a runner or mold 34 of an injection molding system (or the like). The injection molding system has been omitted for the sake of clarity and brevity, but of course includes force generation assemblies (typically in the form of tie-bars, clamp units and processor-controlled hydraulic systems), as will be readily appreciated. The carriage has a mechanical alignment mechanism (represented by arrow 36) that allows limited lateral displacement of the injection unit 32 relative to the mold 34 to develop better channel alignment. Through the use of the alignment mechanism, the inherent channel misalignment of FIG. 2 can, to some degree, be compensated towards the ideal channel alignment shown in FIG. 1.

Figure 4:
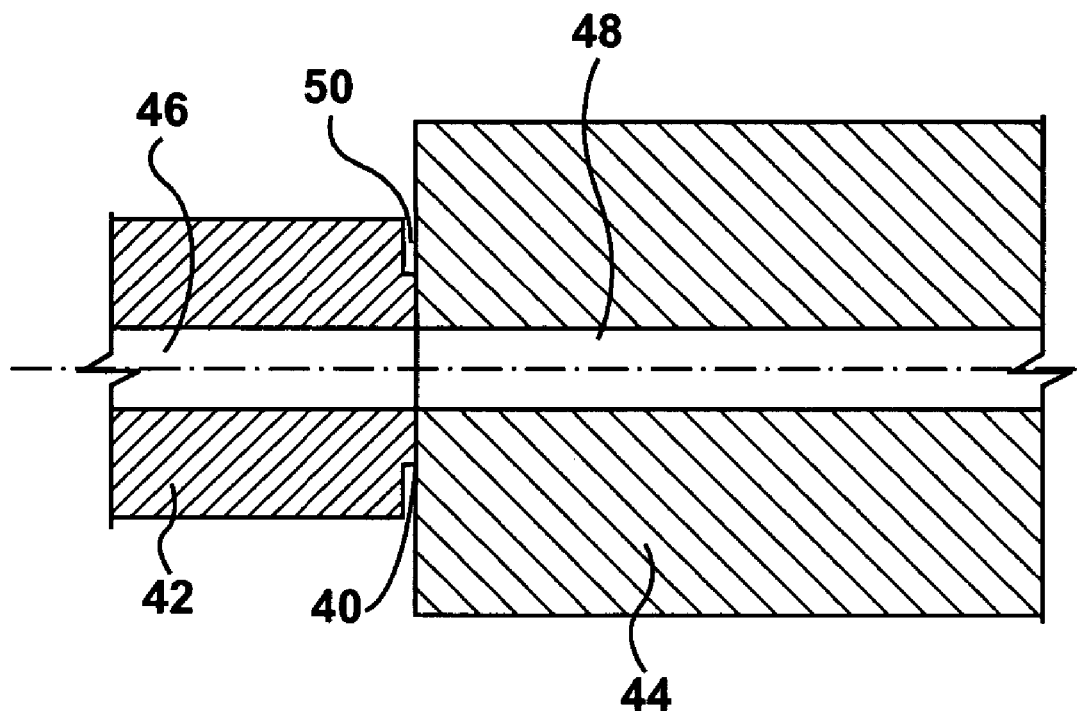
FIG. 4 shows a nozzle sprue interface realised in the present invention.

The concept of the present invention can best be understood with reference to FIGS. 1 and 4. Rather than having a radial seat into which the convex nozzle locates, the nozzle-distributor interface 40 is realised by abutting, substantially planar faces on both the nozzle 42 and sprue bushing 44. Again, both the nozzle 42 and the sprue bushing contain central melt flow channels 46, 48 that are, in use, ideally perfectly aligned within the molding system.

Figure 5:
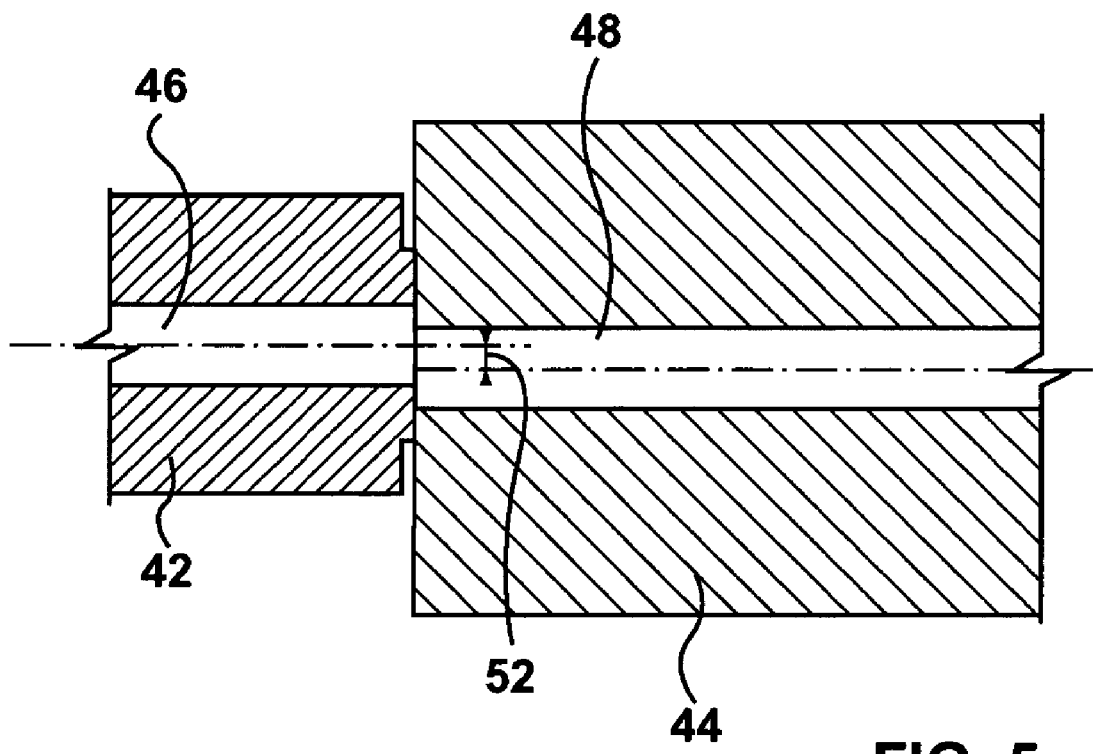
FIG. 5 shows the consequences of misalignment of the nozzle sprue interface realised in the present invention.

As will be appreciated, seldom if ever is it possible to seat the nozzle into the sprue bushing to form a perfectly aligned sealing interface, especially where there are multiple simultaneous feeds from the nozzle into different sprue bushes (or their functional equivalent). Hence, in the prior art, drooling is not uncommon. In contrast, by providing a substantially planar surface interface 40 (of the present invention), annular contact around the melt channels 46, 48 is maintained (even if there is a slight radial displacement 52 of one melt channel with respect to the other melt channel, as shown in FIG. 5). In other words, whilst a melt channel diameter at the interface 40 may diminish, there is no gap in the annular seal about the melt channels 46, 48 and hence no drooling.

Additionally, the nozzle 42 preferably has a stepped profile, whereby an annular recess 50 surrounds the nozzle-distributor interface 40. The purpose of the recess is to reduce the contact surface area in order to achieve optimum specific contact pressure for most effective sealing.

Furthermore, the abutting, flat surfaces facilitate control in an axial direction of the positioning of the sprue bushing; this permits easier measuring of the location of the hot runner nozzle relative to the sprue bushing (as required for machine set up purposes). More specifically, the flat nozzle facilitates accurate measurement of the sprue bushing (on contrast with a spherical nozzle tip) which is important to assure the application of the correct and appropriate nozzle contact force for effective, robust sealing.

The face of the nozzle face can preferably be protected by a locating ring (shown in FIG. 6) of a carrier and the face of the sprue bushing face can likewise be protected by the locating ring of the mold. Consequently, the mold can touch the carrier face and the nozzle will touch the sprue bushing only when both locating rings are in perfect alignment.

Figure 6:
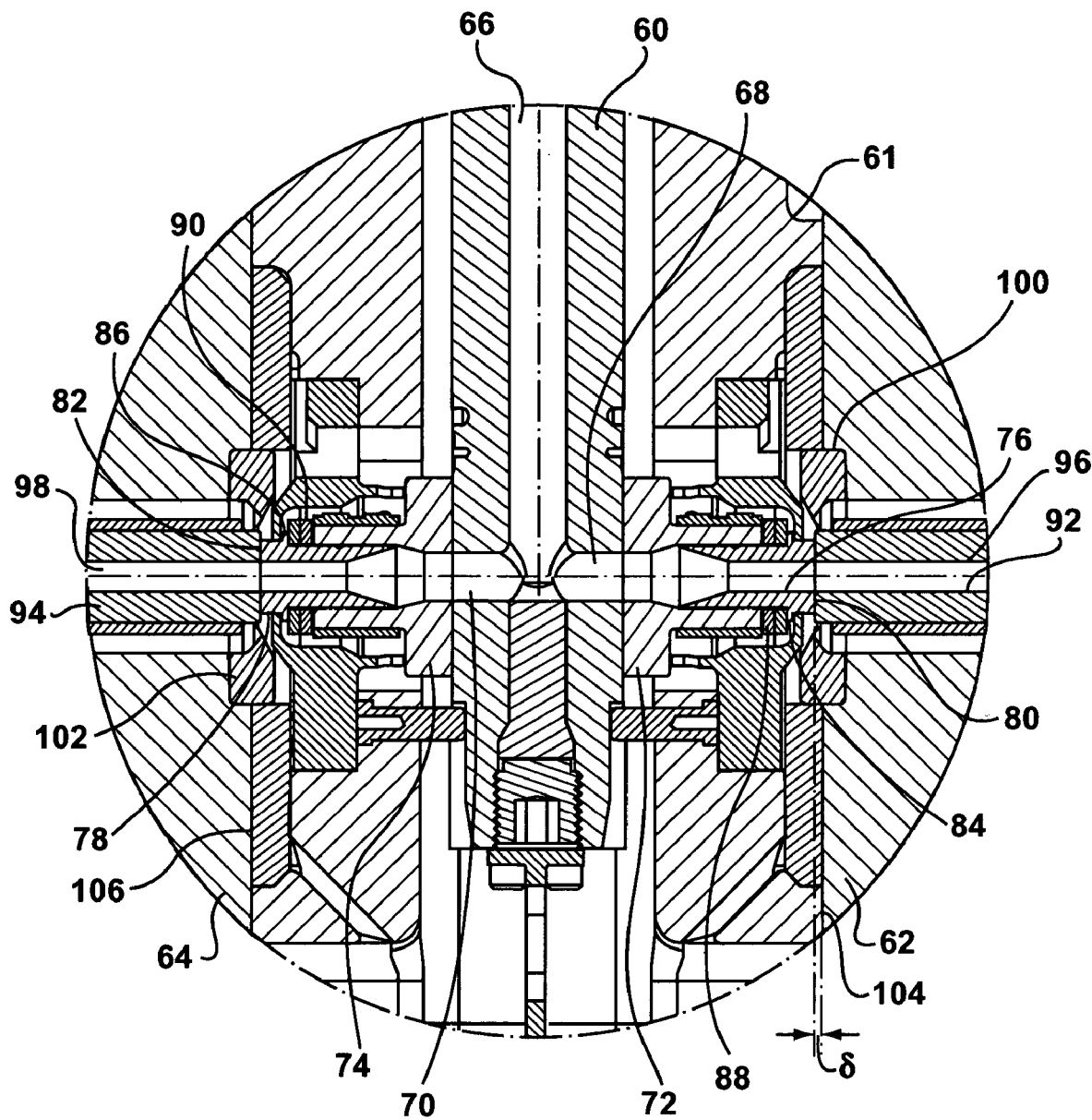
FIG. 6 is a detailed plan view illustration of a dual interface, in accordance with a preferred embodiment of the present invention, between a hot runner in a nozzle and multiple molds.

Turning now to the preferred embodiment of FIG. 6, the interface of the present invention is shown in the exemplary context of a hot runner system 60 supported on a centre-section carrier 61 supporting a plurality of molds 62, 64. Each of the molds is secured to a respective face of the centre-section carrier 61. The centre-section carrier therefore acts as a platen in a molding environment in which there is a structural symmetry about a central melt channel 66 within the hot runner system.

In a preferred embodiment, towards the middle of the centre-section carrier, the central melt channel 66 splits to feed separate melt channel branches 68, 70 extending substantially perpendicularly relative to the both the central melt channel 66 and the faces of the centre-section carrier 61. Each branch 68, 70 terminates in a spigot that is fixed relative to the central melt channel 66 by a T-shaped hot runner nozzle base 72, 74 that surrounds each spigot. A hot runner nozzle 76, 78 (having a flat face 80, 82 in accordance with FIGS. 4 and 5) abuts against the spigot and is located within the hot runner nozzle base 72, 74. An annular flange 84, 86 on the hot runner nozzle 76, 78 permits a cup-spring 88, 90 to be positioned between the hot runner nozzle base 72, 74 and the hot runner nozzle 76, 78. The cup-spring acts to spring-load the hot runner nozzle against a sprue bushing 92, 94 located in each mold 62, 64, with the cup-spring providing a limited stroke capability. The sprue bushing 92, 94 has a flat sealing face (as shown in FIGS. 4&5) that provides a sealing surface and interface to the flat face 80, 82 of each hot runner nozzle 76, 78. As such, a central melt channel within the sprue bushing 92, 94 aligns with the central melt channel 66 of the hot runner system 60 via the hot runner nozzle, the spigot and the hot runner nozzle base. The flange 84 also acts against a stop provided by the nozzle retaining ring to limit the outward movement of the nozzle 77, 78 prior to the nozzle being brought into sealing contact with the sprue bushing.

Optionally, a mold locating ring 100, 102 bridges both sides of the mold-platen interface 104, 106, with the mold locating ring 100, 102 therefore surrounding the nozzle-distributor interface between the hot runner nozzle 76, 78 and the sprue bushing 92, 94. The mold locating ring 100, 102 therefore provides a stepped profile to the mold-platen interface 104, 106. The flat hot runner-sprue interface (of the present invention) is recessed relative to both the mold-platen interface 104, 106 and a surface of the mold locating ring that is remote to the mold 62, 64. The recess has a dimension • of typically about 5 to 10 millimeters. Consequently, when a mold 62, 64 is loaded into the carrier or platen 61, the locating ring 100, 102 first engages a corresponding diameter in the platen before the flat surfaces of the nozzle and sprue bush touch, thereby promoting good alignment and eliminating the risk of mechanical damage to the sealing surfaces.

The remaining structure within the tandem carrier and the mold, such as purge channels, heaters and nozzle retaining structure are conventional in fashion, as will be readily appreciated by the skilled addressee.

With the dual melt channel distributor arrangement of FIG. 6, movement of the sprue bushing 92 relative to the nozzle 76, 78 is extremely limited, especially in the transverse direction with respect to a longitudinal axis of an injection molding machine in which the centre-section carrier is located. By employing the flat nozzle-sprue bushing interface of the present invention, leakage otherwise arising from potentially accentuated melt channel misalignment from the back-to-back configuration of sprue bushings is eliminated. Any radial misalignment of the sprue bushing is therefore mitigated by the flat nozzle-sprue bushing interface of the present invention. The flat nozzle-sprue interface of the present invention also addresses the relative shortness, stiffness and lack of mechanical flexibility of the nozzle that could otherwise give rise to drooling.

It is noted that the illustration in FIG. 6 shows an operational condition for the distribution system in which thermal expansion of the components has occurred. It will therefore be understood that components within the system are necessarily dimensioned to account for thermal expansion and the production of an effective seal, i.e. the design of the hot runner system 60 allows relative sliding between the nozzles 76, 78 and sprue bushings 92, 94.

It is also noted that, in relation to the embodiment of FIG. 6, a fixed point of the hot runner 66 is at the intersection with the injection centerline (not shown) whereby a strong anchor point for the injection connection is provided. This is absolutely required to assure perfect sealing at the injection nozzle (not shown).

The interface configuration of the present invention also permits for easier measurement of the relative positions of the nozzle and sprue, since measurements may be made relative to a reference block placed outside of the locating ring 100, 102. In other words, the exact location of the mating sealing surfaces can be more easily assessed with the flat interface of the present invention, with this measurement also assisting in ensuring the application of appropriate contact pressure, as will be understood.

It will, of course, be appreciated that the above description has been given by way of example only and that modifications in detail may be made within the scope of the present invention. For example, the interface of the present invention can find application in individual melt channel environments when a nozzle (or the like) interfaces to a single mold component. Equally, the interface can find application within any form of system in which a flow path must be maintained between abutting components, including thixomolding applications.

What is claimed is:

1. A mold carrier having:
   a first external surface and a second external surface being located opposite the first external surface, arranged to mount, in use, mold halves;
   a main hot runner channel;
   first and second hot runner nozzles in a back-to-back configuration, the first and second hot runner nozzles having bases and connected to the main hot runner channel to receive, in use, molten plastic therefrom, the first and second hot runner nozzles each having a substantially planar sealing surface configured to provide an interface, in use, to a substantially planar interface surface in the mold halves; and
   sprue bushings being received in the mold halves; and
   mold locating rings being received by the first external surface and the second external surface, the mold locating rings being configured to locate and position the mold halves relative to the first and second hot runner nozzles and of the sprue bushings, and the mold locating rings aligning and locating with a selected one of the mold halves so that the first and second hot runner nozzles may touch the sprue bushings.

2. The mold carrier according to claim 1, further comprising:
hot runner nozzle bases being coupled with the main hot runner channel; and
springs operatively mounted between the hot runner nozzle bases and nozzles to spring-load the nozzles against the mold halves for improved sealing.

3. A mold carrier as claimed in claim 1, wherein:
the substantially planar sealing surface of the first and second hot runner nozzles is recessed behind its respective external surface of the mold carrier.

4. A molding machine, comprising:
a) a mold carrier having:
a first external surface and a second external surface opposite the first external surface, the first external surface and the second external surface being substantially planar and each surface arranged to mount, in use, respective mold halves;
a melt channel distribution system; and
first and second machine nozzles in a back-to-back configuration, the first and second machine nozzles connected to the melt channel distribution system to receive, in use, molten plastic therefrom, the first and second machine nozzles having substantially planar sealing surfaces being configured as an interface; and
b) first and second mold halves respectively mounted in each of the first external surface and the second external surface, the first and second mold halves including sprue bushings having a substantially planar interface surface in sealing contact with a respective one of the substantially planar sealing surfaces of the first and second machine nozzles, whereby planar interfaces are formed between the first and second machine nozzles and the sprue bushings;
the first and second machine nozzles and the sprue bushings each having melt channels, the planar interfaces cooperating to produce sealing contacts between the first and second machine nozzles and the sprue bushings on both sides of the mold carrier about the melt channels,
the sprue bushings being received in the respective mold halves; and
the mold carrier further having:
mold locating rings being received by the first external surface and the second external surface, the mold locating rings being configured to locate and position the respective mold halves relative to the first and second machine nozzles and of the sprue bushings, and the mold locating rings aligning and locating with a selected one of the first and second mold halves so that the first and second machine nozzles may touch the sprue bushings.

5. The molding machine according to claim 4, further comprising:
hot runner nozzle bases being coupled with the melt channel distribution system; and
springs operatively mounted between the hot runner nozzle bases and the first and second machine nozzles to spring-load the first and second machine nozzles against the first and second mold halves for improved sealing.

6. The molding machine according to claim 5, wherein:
the substantially planar sealing surfaces of the first and second machine nozzles are recessed behind its respective external surface of the mold carrier.

7. The molding machine according to claim 4, wherein:
the first external surface and the second external surface are substantially planar.

\* \* \* \* \*